(12) United States Patent
Montague

(10) Patent No.: US 10,858,816 B2
(45) Date of Patent: Dec. 8, 2020

(54) CONICAL FILTERING DEVICE

(71) Applicant: Bryant Montague, Raleigh, NC (US)

(72) Inventor: Bryant Montague, Raleigh, NC (US)

(*) Notice: Subject to any disclaimer, the term of this patent is extended or adjusted under 35 U.S.C. 154(b) by 1 day.

(21) Appl. No.: 16/217,655

(22) Filed: Dec. 12, 2018

(65) Prior Publication Data

US 2019/0177962 A1 Jun. 13, 2019

Related U.S. Application Data

(60) Provisional application No. 62/597,615, filed on Dec. 12, 2017.

(51) Int. Cl.
| | |
|---|---|
| *B01D 24/08* | (2006.01) |
| *E03F 5/04* | (2006.01) |
| *B01D 29/31* | (2006.01) |
| *B01D 29/35* | (2006.01) |
| *B01D 24/20* | (2006.01) |

(52) U.S. Cl.
CPC ............ *E03F 5/0404* (2013.01); *B01D 24/08* (2013.01); *B01D 24/20* (2013.01); *B01D 29/31* (2013.01); *B01D 29/35* (2013.01); *B01D 2201/02* (2013.01)

(58) Field of Classification Search
CPC ........ B01D 24/04; B01D 24/08; B01D 24/20; B01D 24/40; B01D 24/402; B01D 29/31; B01D 29/35; B01D 2201/02

USPC ..... 210/747.1, 747.5, 747.9, 170.01, 170.09, 210/266, 283, 291, 498

See application file for complete search history.

(56) References Cited

U.S. PATENT DOCUMENTS

| | | | | |
|---|---|---|---|---|
| 616,364 | A * | 12/1898 | Shreeve | B01D 24/004 210/266 |
| 748,230 | A * | 12/1903 | Stout | C02F 1/003 210/266 |
| 2,232,423 | A * | 2/1941 | Alkire | B01D 24/04 210/350 |
| 3,301,403 | A * | 1/1967 | Reminder | B01D 35/02 210/266 |
| 3,893,925 | A * | 7/1975 | Jones | B01D 17/0202 210/266 |
| 5,637,211 | A * | 6/1997 | Neff | B01D 29/27 210/170.01 |
| 9,719,240 | B1 | 8/2017 | Montague | |
| 2011/0284442 | A1* | 11/2011 | Williams | B01D 29/27 210/170.09 |
| 2015/0021247 | A1* | 1/2015 | Lin-Hendel | E03B 1/041 210/170.01 |

* cited by examiner

*Primary Examiner* — Christopher Upton
(74) *Attorney, Agent, or Firm* — Coats & Bennett PLLC

(57) ABSTRACT

The present invention relates to a conical filter used to filter storm water being directed into a catch basin and to filter water being pumped from a sediment pond.

7 Claims, 9 Drawing Sheets

CONICAL FILTERING DEVICE

CROSS-REFERENCE TO RELATED APPLICATION

This application claims priority under 35 U.S.C. § 119(e) from the following U.S. provisional application: Application Ser. No. 62/597,615 filed on Dec. 12, 2017. That application is incorporated in its entirety by reference herein.

FIELD OF THE INVENTION

The present invention relates to soil erosion protection systems and devices and also to systems and processes for filtering water discharged from sediment ponds and other ponds.

BACKGROUND OF THE INVENTION

During construction periods, storm drain catch basins and the like must be protected. That is, various local and state regulations require developers to prevent silt, debris and other objects from entering the catch basins during construction of roads and streets. Typically, grading contractors and others that build infrastructure for subdivisions and other developments will erect a structure around the storm drain catch basin to catch silt, debris and other unwanted materials. In one example, the structure utilized comprises a series of vertical posts that are erected around the catch basin. After the posts are erected, a silt fence is wrapped around and secured to the post such that the silt fence extends around the inlet to the catch basin.

There are a number of problems with this approach. First, building temporary silt protection devices around each catch basin is very laborious, time consuming and expensive. A normal subdivision will have many catch basins and, in the end, erecting these temporary silt fences is extremely costly. The second problem is that conventional silt fences around storm drain catch basins are not entirely effective. They often fail. This occurs sometimes when there is a large storm and large amounts of storm water rush toward the silt fence extending around the catch basin. It is not unusual for the storm water to carry so much silt and debris that the fence and the structure supporting the fence collapse, resulting in substantial volumes of silt, debris and other unwanted objects entering the catch basin.

There are various types of sediment ponds. From time to time and under various circumstances, these sediment ponds have to be cleaned and that in turn, in some cases, requires that the water contained in the sediment ponds be pumped out and discharged. For example, storm water ponds are designed to be catch basins for developed areas. These types of ponds collect storm water runoff, as well as sand, silt, fines, and other forms of pollutants. Pumping and discharging water from sediment ponds requires complying with federal, state and local regulations relating to the discharge of such water. Indeed, in many cases the water pumped from such sediment ponds must be filtered or treated to remove sediment or muck from the water prior to discharge.

Therefore, there is a need for a practical and low cost catch basin protection device, as well as a practical and effective way of filtering and discharging water from sediment ponds.

SUMMARY OF THE INVENTION

The present invention relates to a multipurpose conical filter that can be used to filter storm water prior to the storm water entering a catch basin or can be used to filter water, pumped from a sediment pond, prior to discharge.

The conical filter includes a surrounding wall structure with an array of openings formed therein. When used to filter storm water prior to the storm water entering a catch basin, the conical filter and a stone holder are placed over a catch basin. The incoming storm water is constrained to move or flow through the stones and from the stones into and through the array of openings in the surrounding wall structure and from there downwardly through the conical filter into the underlying catch basin.

When used to filter water being pumped from a sediment pond, the conical filter is placed downstream from the sediment pond and a pump that is employed to pump the water from the sediment pond. Water from the sediment pond is pumped into a top portion of the conical filter. The pump forces the water downwardly through the conical filter. As noted above, the conical filter includes a surrounding wall structure that includes an array of openings. In this case, the bottom of the conical filter is closed or substantially closed by a base and this effectively restricts the flow of water downwardly through the conical filter. This restriction of flow causes the water entering the interior of the conical filter to be expelled out the sides or the surrounding wall structure of the conical filter having the array of openings. This causes the sediment, including sand, silt, fines and mud, etc. to be separated and trapped interiorly within the conical filter. Once a certain amount of solids are collected in the interior of the conical filter, the conical filter is lifted from a base and the solids are cleaned or removed from the base. In some embodiments, the conical filter is secured to a stone holder that receives and holds stones about the exterior of the surrounding wall structure. Hence, the water expelled through the openings of the surrounding wall structure is constrained to move through the stones held by the stone holder.

Other objects and advantages of the present invention will become apparent and obvious from a study of the following description and the accompanying drawings which are merely illustrative of such invention.

DESCRIPTION OF EXEMPLARY EMBODIMENTS

Figure 1:
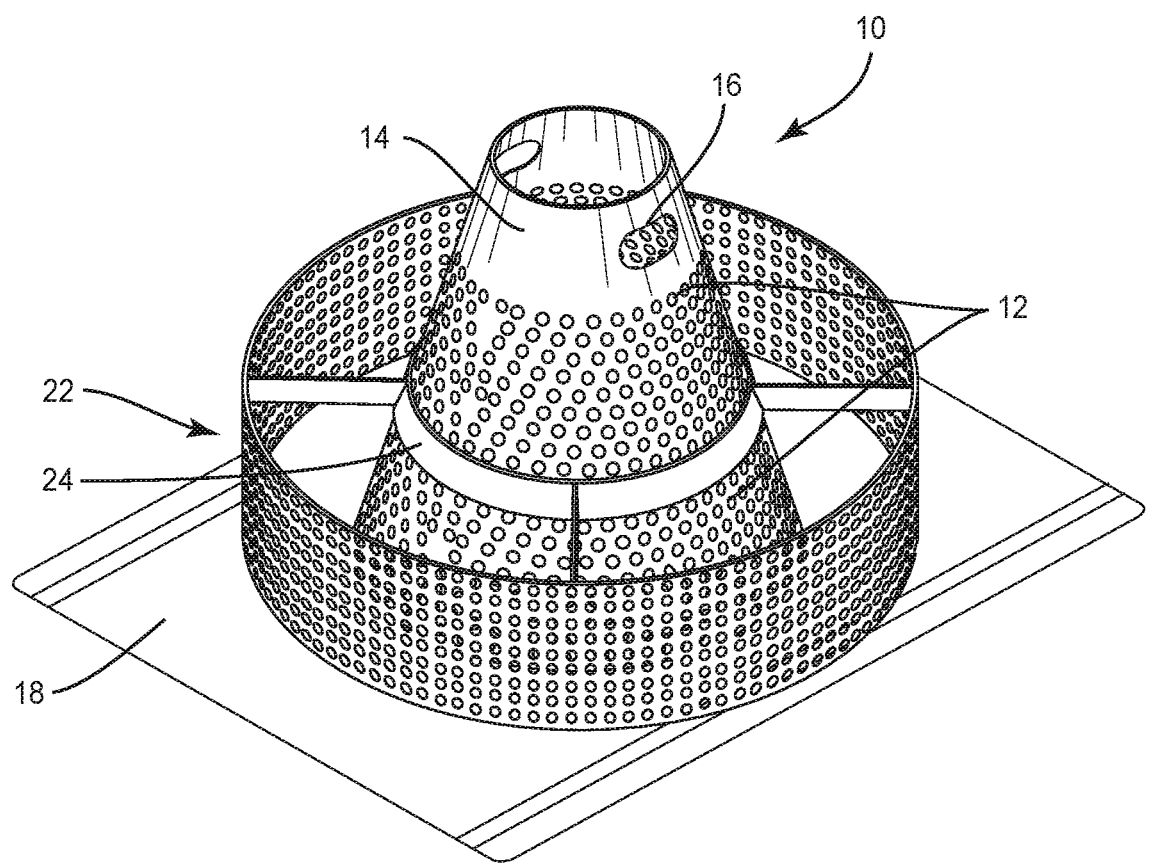
FIG. 1 is a perspective view of the portable catch basin protection device.

With further reference to the drawings, particularly FIGS. 1-6, there is shown therein two embodiments for a conical storm water inlet protection device. The conical storm water inlet protection device is designed to be used in conjunction with a catch basin. See, for example, FIG. 3A. The protection device includes a conical screen 10 supported on a base or support panel 18. See FIG. 1. The conical screen 10 assumes a conical shape with the base or lower portion thereof having a larger diameter than the upper portion. That is, the conical screen 10 includes a relatively large lower opening and a relatively small upper opening. The upper opening can be capped if desired. The conical screen includes a conical wall or surrounding wall structure with an array of openings 12. In this particular embodiment, the openings 12 are distributed around the conical wall from the bottom to an upper portion of the conical screen. Note in FIG. 1 where an upper portion 14 of the conical wall does not include the small apertures that are formed in the intermediate and bottom portion of the conical wall. However, this upper portion 14 includes a pair of openings 16 that can serve as hand openings or connection points to a mechanical lifting device.

Conical screen 10 can be constructed of various suitable materials, such as metal, plastic, etc. In one embodiment, the conical screen 10 is connected to the base 18 and in another embodiment, the conical screen 10 is not attached to the base and is easily removed therefrom. Note that the base 18 is typically designed to fit over an upper opening of a catch basin. See FIG. 3A. Thus, as will be understood and appreciated in subsequent portions of this disclosure, storm water entering the conical screen will pass through the array of openings 12 into the interior of the conical screen and therefrom downwardly into the underlying catch basin.

The device shown in FIGS. 1-6 includes a fence indicated generally by the numeral 22. Fence 22 extends around the conical screen 10 and defines a space there between. The defined space between the fence 22 and the conical screen serves to receive, hold and retain stones that are used for filtering the storm water before entering the conical screen 10. The stones act as a filter media and tend to filter or capture silt, debris, and other objects that are entrained in the storm water flowing into the conical screen.

Figure 2:
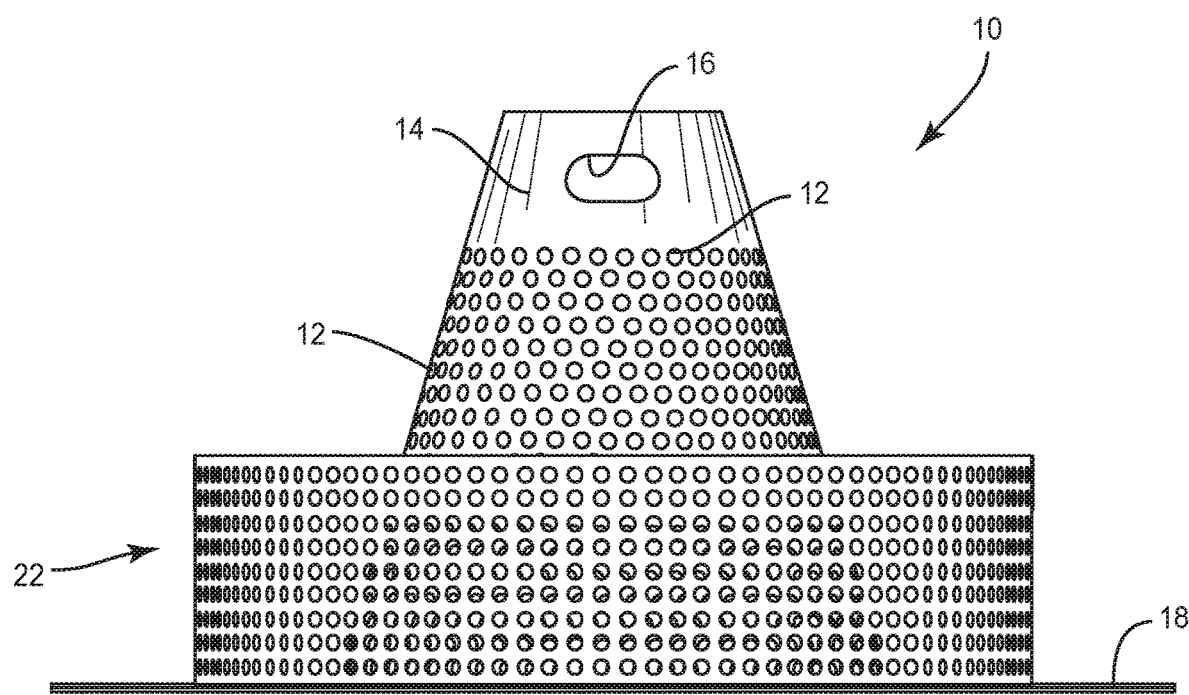
FIG. 2 is a side elevational view of the catch basin protection device.
Figure 3:
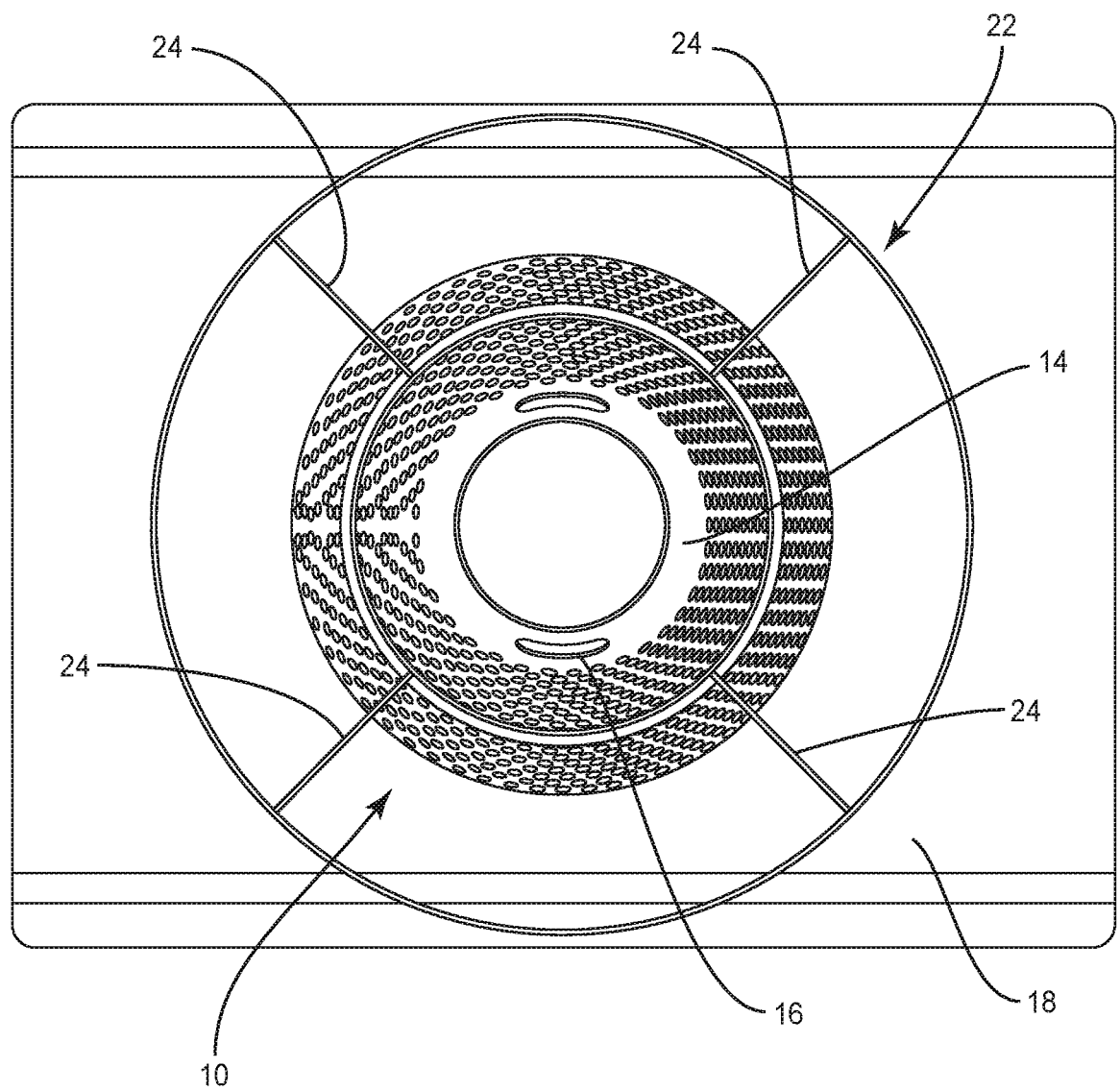
FIG. 3 is a top plan view of the portable catch basin protection device.
Figure 3A:
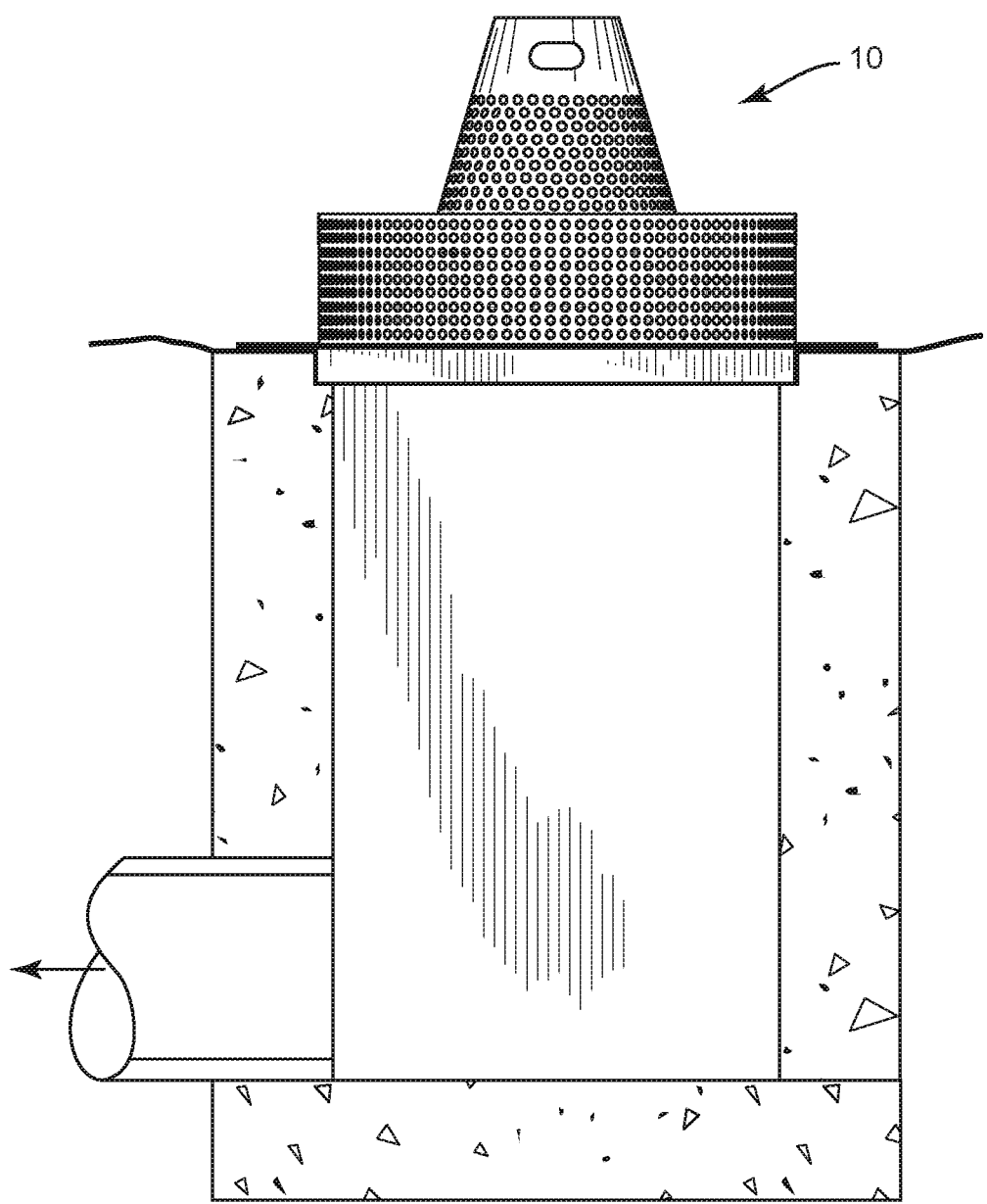
FIG. 3A is an illustration showing the portable catch basin protection device mounted on a catch basin.

Note in the embodiment shown in FIGS. 1-3 that there is a frame structure 24 that interconnects the fence 22 with the conical screen 10. In particular, as shown in FIG. 1, the support structure 24 includes a series of radial arms secured to the fence and projecting inwardly therefrom to where the radial arms connect to a circular band that engages and extends around an intermediate portion of the conical screen 10. This tends to stabilize the conical screen and retain it within the confines of the fence 22.

Figure 4:
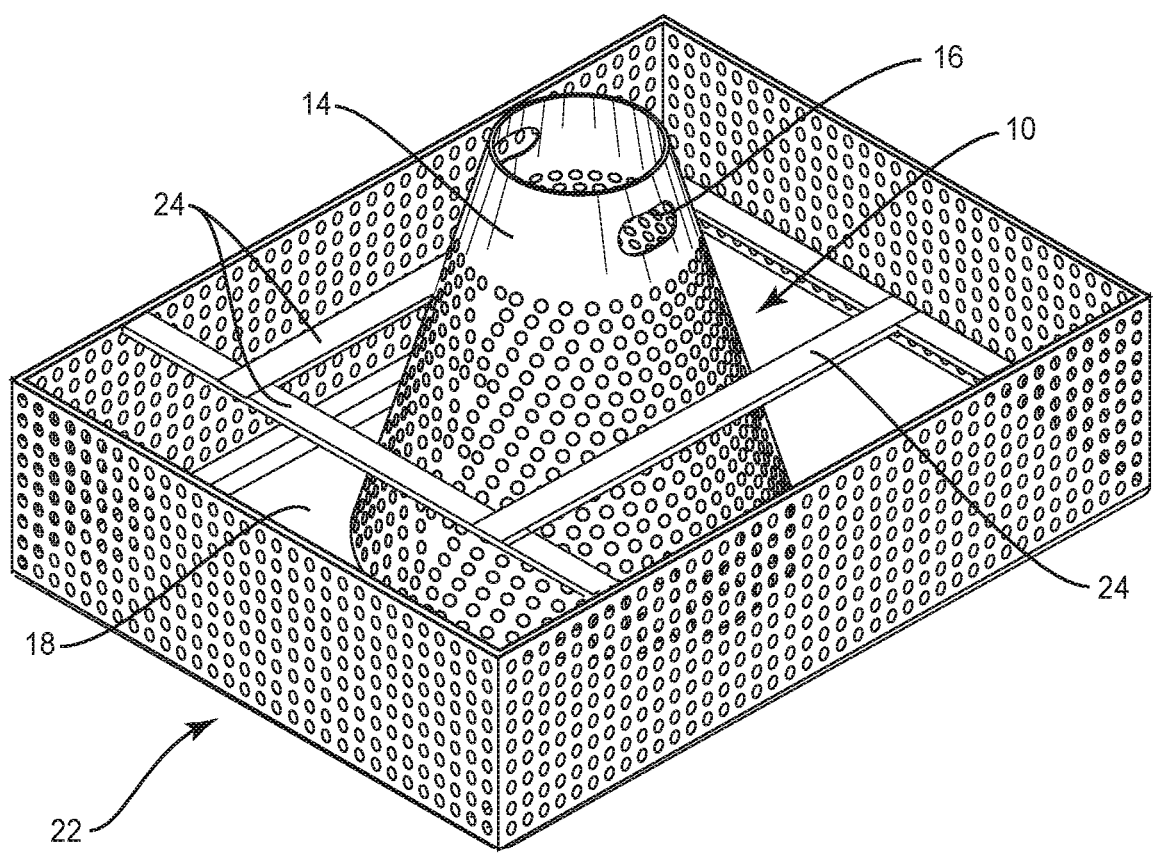
FIG. 4 is a perspective view of an alternate embodiment for the catch basin protection device.
Figure 5:
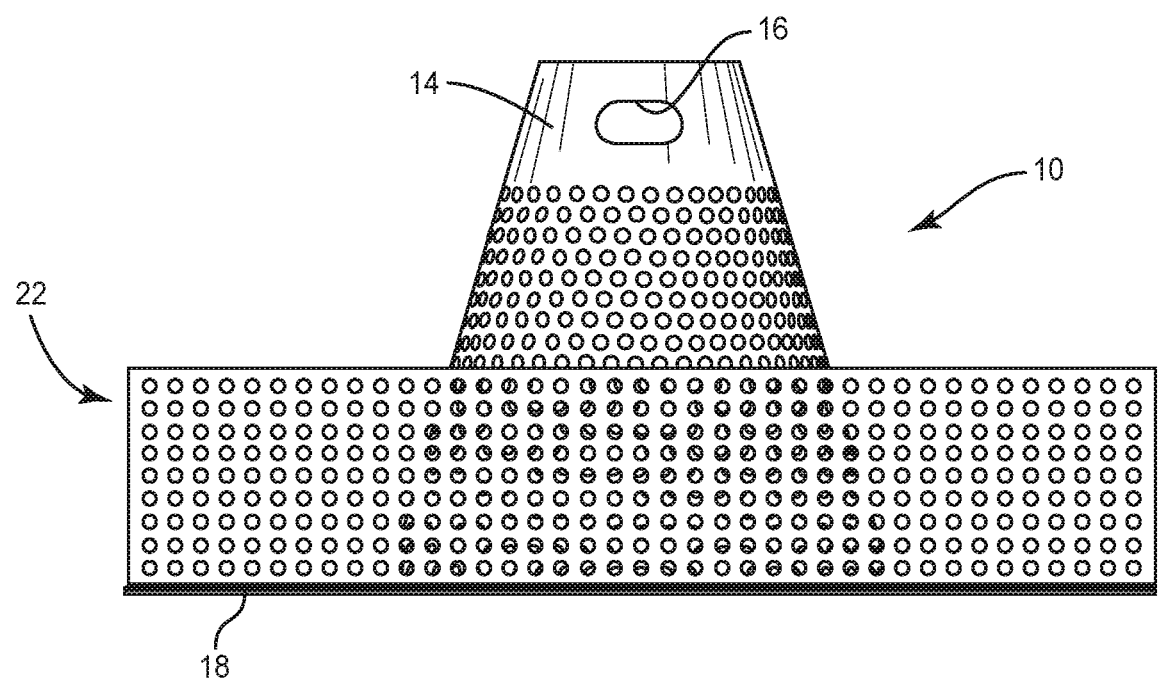
FIG. 5 is a side elevational view of the device shown in FIG. 4.
Figure 6:
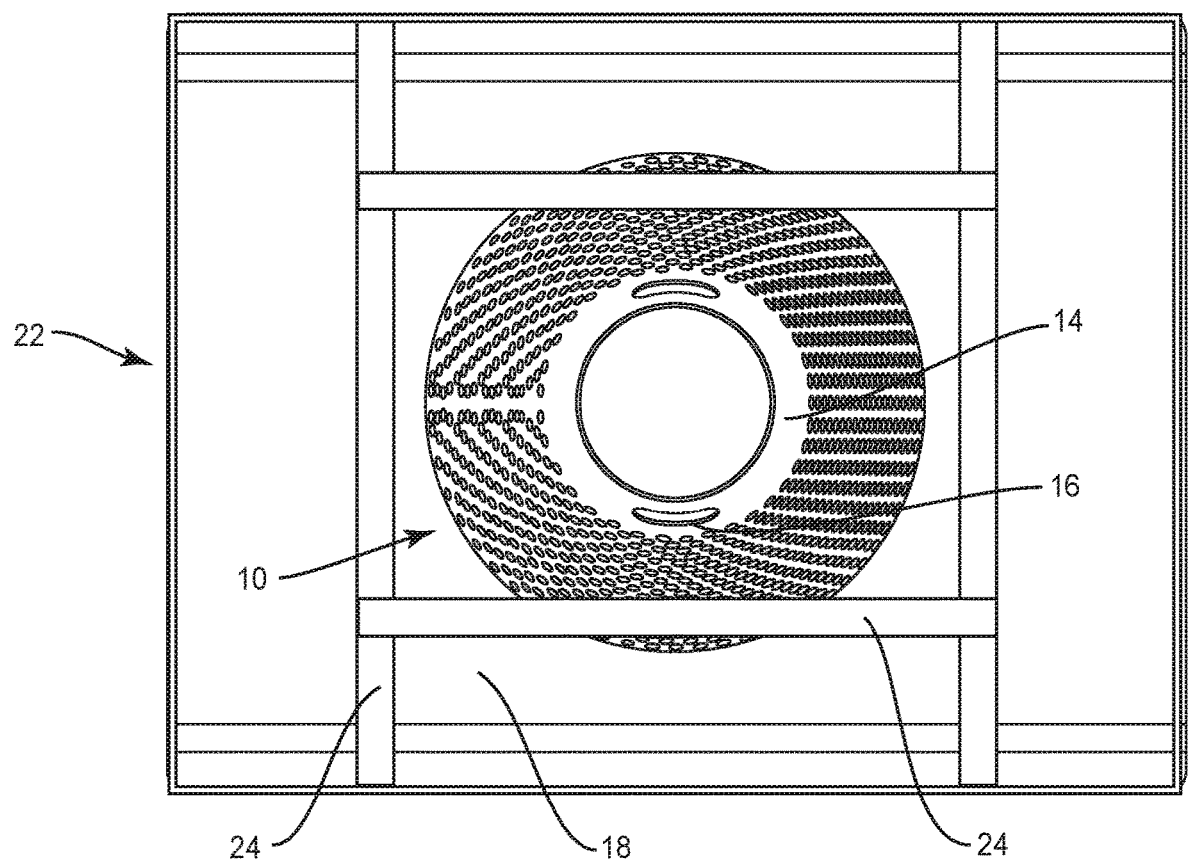
FIG. 6 is a top plan view of the device shown in FIG. 4.

Turning to the embodiment shown in FIG. 4-6, a second embodiment of the present invention is shown therein. Here the conical screen 10 is surrounded by a rectangular or square-shaped fence 22. Again, the fence 22 is spaced outwardly from the conical screen 10 and is configured to define a space between the fence and the conical screen for stones. It is appreciated that an array of stones can be placed in the defined space between the fence 22 and the conical screen 10. Not only does the fence 22 serve to retain the stones around the conical screen, but the fence also facilitates movement of the entire device from one catch basin to another catch basin. In particular, the fence 22 in both embodiments prevents the stones from falling off the base 18 when the device is being moved from one location to another location.

In the embodiment shown in FIGS. 4-6, there is an interconnecting frame structure 24 which maintains the conical screen 10 within the fence 22. In the case of the second embodiment, the fence 22 assumes a rectangular or square configuration.

Figure 7:
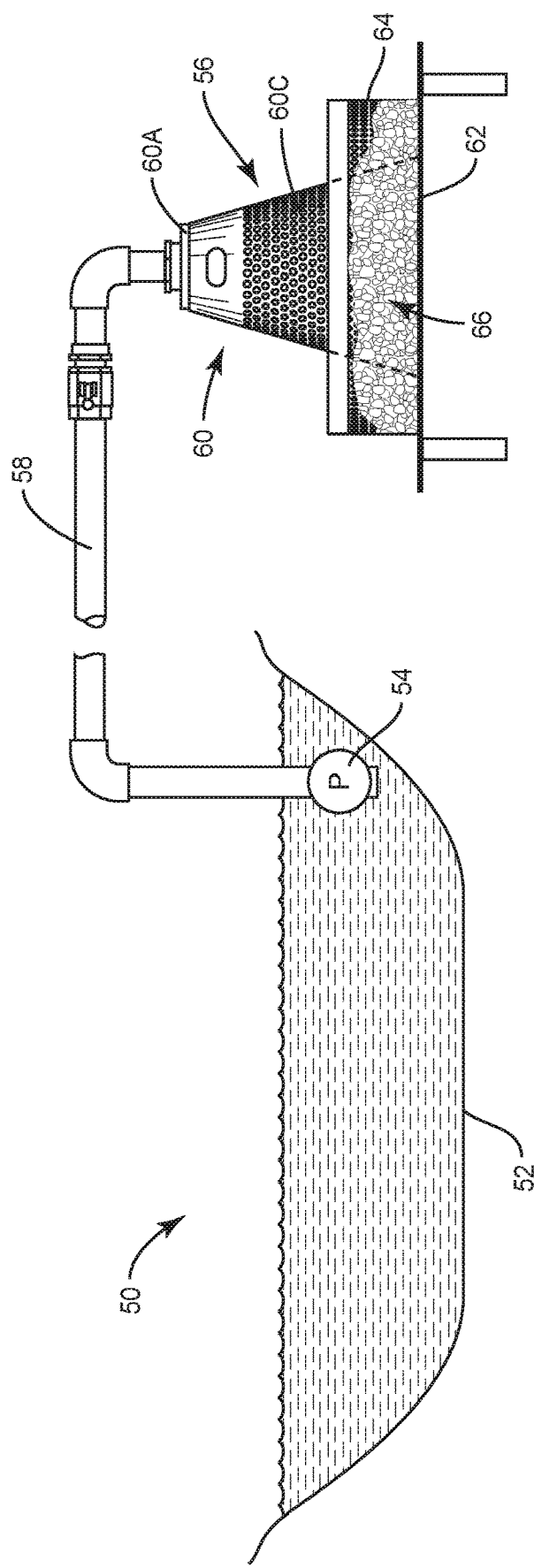
FIG. 7 illustrates a system and process for discharging water from a sediment pond and filtering the water to remove sediment.
Figure 8A:
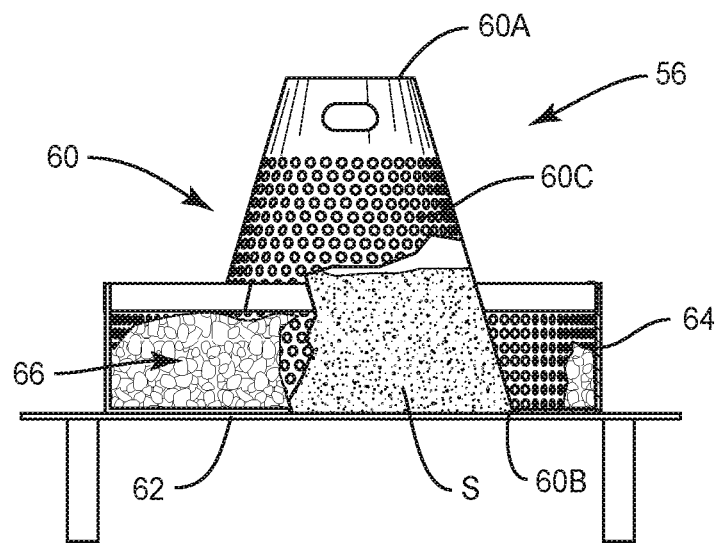
FIG. 8A shows the filter and stone holder supported on a base and depicts the accumulated sediment within the interior area of the filter.
Figure 8B:
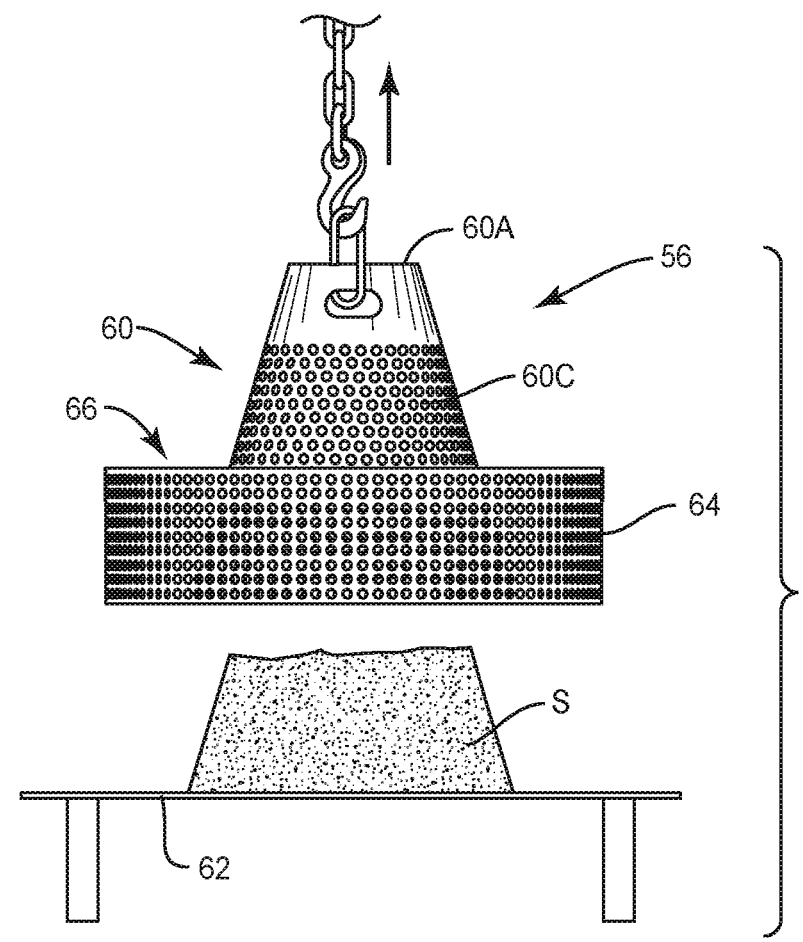
FIG. 8B illustrates the process of cleaning and removing the accumulated sediment.

With further reference to the drawings, particularly FIGS. 7 and 8, a system and process is shown for pumping and filtering water from a sediment pond 52. As discussed above, the problem is the potential for discharging water from a sediment pond that includes pollutants of any kind that may exceed regulatory limits. This is particularly true with sediment, such as sand, silt, mud, debris, etc. The discussion here refers to removing sediment from the water being pumped from a pond. The term "sediment" as used herein includes a broad meaning and includes matter, materials and solids that settle in the pond and further includes mud, silt, sand, fines, suspended solids and muck in general.

The system for discharging and filtering water from a sediment pond 52 is indicated generally by the numeral 50. The system includes a pump 54 associated with sediment pond 52. The placement of the pump 54 can vary. In some cases, one might elect to use a submersible pump and in other cases one might elect to use a non-submersible pump. Downstream from the pump 54 is a filtering device indicated generally by the numeral 56. Pump 54 pumps water from the sediment pond 52 via a pipe 58 into the filtering device 56.

Viewing the filtering device 56 in more detail, it comprises a surrounding wall structure 60. In this particular embodiment, the surrounding wall structure 60 assumes a conical shape with a top portion 60A being smaller than the bottom 60B. See FIG. 8A. Formed in the surrounding wall structure 60 is an array of openings 60C. Defined within the interior of the surrounding wall structure 60 is an interior space or area for collecting sediment.

Surrounding wall structure 60 is configured to be supported on a horizontal base 62. In some cases, the surrounding wall structure 60 can be detachably secured to the base 62 and in other cases there may not be an attachment between the surrounding wall structure and the base. The conical filter 56, however, forms a part of an assembly that receives and holds stones. See FIG. 8B. This assembly includes a floor that extends outwardly from the base of the filtering device 56. This floor is configured to receive and hold stones around the exterior of the surrounding wall structure 60. This assembly also includes a fence 64 that is secured to the floor and extends around the surrounding wall structure 60. Fence 64 and the surrounding wall structure 60 define an area for receiving and holding stones that are utilized in the filtering process. It is appreciated that this total assembly, including the filtering device 56, the fence 64 and the floor that holds the stones, can be lifted and moved as a unit. See FIG. 8B. As discussed below, this facilitates removing the sediment collected by the filtering device.

In carrying out the method of the present invention, the pump 54 pumps water from the sediment pond 52 into an inlet formed in the top portion 60A of the surrounding wall structure 60. Note in FIG. 7 where the inlet is formed in the top of the surrounding wall structure. Pump 54 powers the water into the inlet and downwardly through the interior space of the surrounding wall structure. As noted above, the surrounding wall structure 60 is placed on the base 62. The base 62 is generally closed under the surrounding wall structure 60. Thus, the base 62 tends to restrict or block the flow of water from the bottom of the filter 56. This means that the pump 54 effectively forces the water downwardly through the interior space of the surrounding wall structure and outwardly therefrom through the opening 60C formed in the surrounding wall structure. In this process, pollutants in the form of sediment are caused to separate from the water and to collect and accumulate in the interior space of the surrounding wall structure 60. See FIG. 8B and the accumulation of sediment S on the base 62 when the filter and stone holder assembly is removed from the base. The effluent from the surrounding wall structure 60 is clarified, to a certain extent at least, by the separation and removal of sediments from the water. Over time the collected sediments S will accumulate in the interior space of the surrounding wall structure 60. Since the base 62 is supporting the surrounding wall structure 60, it follows that the collected and accumulated sediment S is supported on the base 62. From time to time, it is necessary to clean the sediment S from the interior space. This can be achieved by simply lifting the filter 56, along with the stone holder, from the base 62 and removing the accumulated sediment S, and thereafter replacing the filter and stone holder on the base. See FIGS. 8A and 8B.

Preferable with the base 62 is supported above a ground or other surface. In one embodiment, the filtering device 56 is located near a waterway such that water discharged from the surrounding wall structure 60 and through the stones in the stone holder can move and flow into the waterway. This is appropriate in many circumstances because the filtering device 56 has removed a substantial portion of the sediment in the water.

The term "configured to" means "designed to". For example, there is a reference to the base and conical screen being configured to fit onto and over a catch basin. This means that the base and conical screen are specifically designed to fit onto and over a catch basin.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A system for discharging water from a sediment pond and filtering the water in the process, the system comprising:
    a pump associated with the sediment pond and configured to pump water from the sediment pond;
    a conical filter configured to remove sediment from the water and to retain the sediment in an interior portion of the filter;
    a pipe operatively interconnected between the pump and filter for channeling the water from the sediment pond to the filter;
    the filter including:
    a. a surrounding wall structure having an array of openings formed therein;
    b. a base underlying the surrounding wall structure for supporting the surrounding wall structure;
    c. an interior sediment collection area defined interiorly within the surrounding wall structure;
    d. a water inlet formed in a top portion of the surrounding wall structure and operatively connected to said pipe and configured to permit water to flow from the pipe into a top portion of the surrounding wall structure;
    e. wherein said base for supporting the surrounding wall structure is configured to close a bottom of the surrounding wall structure so as to force the water entering the inlet to pass from the interior of the surrounding wall structure outwardly through the openings in the surrounding wall structure;
    f. media disposed around at least a portion of the exterior of the surrounding wall structure and configured to filter the water expelled outwardly from the surrounding wall structure;
    g. wherein the surrounding wall structure and the openings therein are configured to filter the sediment from the water and retain the sediment within the interior area of the surrounding wall structure; and
    h. wherein the conical filter is secured to a stone holder configured to receive and hold stones about the exterior of the surrounding wall structure; and wherein the conical filter and the stone holder are integrally constructed and configured to be lifted together as a single unit from said base and to expose the sediment collected by the conical filter.

2. The system of claim 1 wherein the surrounding wall structure includes a bottom that is open and wherein the base abuts the bottom and effectively closes the bottom such that the water is constrained to move from the interior of the surrounding wall structure out the array of openings formed in the surrounding wall structure.

3. The system of claim 2 wherein the conical filter includes the surrounding wall structure and wherein the conical filter tapers outwardly and downwardly from said water inlet formed in the top portion of the surrounding wall structure.

4. A method of removing and filtering water from a sediment pond comprising:
    pumping the water from the sediment pond;
    directing the water from the sediment pond into a top portion of a surrounding wall structure having openings formed in the surrounding wall structure, an interior area defined by the surrounding wall structure and a bottom;
    supporting the surrounding wall structure on a base;
    directing the water into an inlet formed in the top portion of the surrounding wall structure and directing the water downwardly through the interior area of the surrounding wall structure;
    restricting the flow of water from the bottom of the surrounding wall structure;
    collecting sediment from the water in the interior of the surrounding wall structure by forcing the water downwardly through the interior of the surrounding wall structure and outwardly through the openings in the surrounding wall structure wherein the sediment is separated from the water and collects in the interior of the surrounding wall structure while being supported by the base; and
    removing the surrounding wall structure from the base and cleaning the sediment collected on the base.

5. The method of claim 4 including piling stones around an exterior portion of the surrounding wall structure and after the water is emitted from the openings in the surrounding wall structure, forcing the water through the stones to further filter the water.

6. The method of claim 4 including stationing the surrounding wall structure adjacent a waterway wherein the water expelled through the surrounding wall structure is discharged into the waterway.

7. The method of claim 4 wherein the surrounding wall structure forms a conically-shaped device that tapers outwardly and downwardly from the inlet to the bottom of the surrounding wall structure.

* * * * *